United States Patent
Miyashita et al.

(10) Patent No.: US 10,280,998 B2
(45) Date of Patent: May 7, 2019

(54) OVERLAID COMPOSITE INTERIOR COMPONENT

(71) Applicants: TOYODA IRON WORKS CO., LTD., Toyota-shi, Aichi (JP); TOYOTA BOSHOKU KABUSHIKI KAISHA, Kariya-shi, Aichi (JP)

(72) Inventors: Osamu Miyashita, Toyota (JP); Hideaki Sakai, Toyota (JP); Masamori Hirose, Toyota (JP); Yoshiaki Tomasu, Kariya (JP)

(73) Assignees: Toyoda Iron Works Co., Ltd., Toyota-shi, Aichi (JP); Toyota Boshoku Kabushiki Kaisha, Kariya-shi, Aichi (JP)

( * ) Notice: Subject to any disclaimer, the term of this patent is extended or adjusted under 35 U.S.C. 154(b) by 0 days.

(21) Appl. No.: 15/311,350

(22) PCT Filed: May 14, 2015

(86) PCT No.: PCT/JP2015/063954
§ 371 (c)(1),
(2) Date: Nov. 15, 2016

(87) PCT Pub. No.: WO2015/182403
PCT Pub. Date: Dec. 3, 2015

(65) Prior Publication Data
US 2017/0122396 A1      May 4, 2017

(30) Foreign Application Priority Data

May 26, 2014   (JP) .................................. 2014-108490
Jan. 29, 2015   (JP) .................................. 2015-016124

(51) Int. Cl.
*B32B 15/16*      (2006.01)
*B32B 27/36*      (2006.01)
(Continued)

(52) U.S. Cl.
CPC ............... *F16F 1/376* (2013.01); *B32B 3/30* (2013.01); *B32B 15/08* (2013.01); *B32B 27/08* (2013.01);
(Continued)

(58) Field of Classification Search
CPC ......... E04F 15/022; E04F 15/07; E04F 15/18; E04F 15/186; E04F 15/026; E04F 15/22;
(Continued)

(56) References Cited

U.S. PATENT DOCUMENTS 2,573,482 A * 10/1951 Peik .......................... E04B 1/86
                                                        181/284
3,197,358 A *  7/1965 Angioletti ............. B29C 43/021
                                                        428/116
(Continued)

FOREIGN PATENT DOCUMENTS

CN      101870275 A      10/2010
EP         2243658 A1    10/2010
(Continued)

OTHER PUBLICATIONS

Search Report issued in European Patent Application No. 15800009.1 dated Jan. 3, 2018.
(Continued)

*Primary Examiner* — Phi D A
(74) *Attorney, Agent, or Firm* — Finnegan, Henderson, Farabow, Garrett & Dunner, LLP

(57) ABSTRACT

A laminated composite interior component including: a first member that has a predetermined mating surface; and a second member made of an elastically deformable resin material and having a plate portion that is generally parallel to the mating surface, the plate portion being integrally provided with a large number of projections that project (Continued)

toward the mating surface such that a space is formed between the mating surface and the plate portion, the second member being disposed so as to be placed on the first member with the projections contacting the mating surface, in which the large number of projections have the same shape as each other, and are configured such that a flexural rigidity of each of the projections against a compressive load is anisotropic around an axis so that the projections are each to be deflected in one direction around the axis, the large number of projections are disposed on line segments that define a shape of a large number of arrangement units in accordance with an arrangement pattern in which the arrangement units are provided regularly, and distal ends of the projections are pressed against the mating surface so that the projections are elastically deformed to impart cushioning properties, the arrangement pattern being determined such that the large number of arrangement units are provided away from each other and proximate line segments of adjacent arrangement units are parallel to each other, and two projections each provided on the proximate line segments being disposed in such an attitude that deflection directions, which correspond to the one direction, of the two projections are parallel to each other and at positions at which a clearance is provided between the two projections when the two projections are deflected.

7 Claims, 12 Drawing Sheets

(51) Int. Cl.

| | | |
|---|---|---|
| *F16F 1/376* | (2006.01) | |
| *B32B 3/30* | (2006.01) | |
| *B60R 13/02* | (2006.01) | |
| *B32B 27/08* | (2006.01) | |
| *B32B 27/30* | (2006.01) | |
| *B32B 27/32* | (2006.01) | |
| *F16F 1/36* | (2006.01) | |
| *B32B 15/08* | (2006.01) | |
| *B32B 7/04* | (2019.01) | |

(52) U.S. Cl.
CPC .......... *B32B 27/302* (2013.01); *B32B 27/304* (2013.01); *B32B 27/32* (2013.01); *B32B 27/36* (2013.01); *B60R 13/02* (2013.01); *F16F 1/3605* (2013.01); *B32B 7/045* (2013.01); *B32B 15/16* (2013.01); *B32B 2307/51* (2013.01); *B32B 2307/546* (2013.01); *B32B 2307/56* (2013.01); *B32B 2323/10* (2013.01); *B32B 2605/003* (2013.01); *B32B 2605/08* (2013.01); *B60R 13/0243* (2013.01); *B60R 13/0256* (2013.01); *B60R 13/0268* (2013.01)

(58) Field of Classification Search
CPC ...... E04F 15/225; B60R 13/02; F16F 1/3605; B32B 15/08; B32B 27/302; B32B 27/36; B32B 2323/10; B32B 2605/003; B32B 13/0243; B32B 13/0256; B32B 13/0268; B32B 7/045; B32B 2307/51; B32B 2307/546; B32B 2307/56; B32B 2605/08
See application file for complete search history.

(56) References Cited

U.S. PATENT DOCUMENTS

| | | | | |
|---|---|---|---|---|
| 4,694,627 | A * | 9/1987 | Omholt | E04F 15/22 52/390 |
| 4,945,697 | A * | 8/1990 | Ott | E04F 15/22 404/31 |
| 4,948,116 | A * | 8/1990 | Vaux | A63C 19/04 404/35 |
| 5,761,867 | A * | 6/1998 | Carling | E01C 13/045 52/177 |
| 6,418,691 | B1 * | 7/2002 | Stroppiana | E01C 13/045 52/403.1 |
| 7,033,666 | B2 * | 4/2006 | Skaja | B32B 3/26 428/143 |
| 7,571,572 | B2 * | 8/2009 | Moller, Jr. | E01C 5/20 404/41 |
| 7,575,795 | B2 * | 8/2009 | Scott | B32B 7/02 428/119 |
| 7,651,757 | B2 * | 1/2010 | Jones | E04F 15/18 428/158 |
| 8,347,575 | B2 * | 1/2013 | Bierwirth | E04F 15/182 181/284 |
| 2007/0062139 | A1 * | 3/2007 | Jones | E04F 15/18 52/403.1 |
| 2008/0236097 | A1 * | 10/2008 | Tinianov | E04C 2/20 52/787.11 |
| 2010/0236176 | A1 * | 9/2010 | Jenkins | E01C 5/20 52/384 |
| 2010/0264680 | A1 | 10/2010 | Ishikawa | |
| 2012/0055108 | A1 * | 3/2012 | Bierwirth | E04F 15/182 52/403.1 |
| 2012/0117906 | A1 * | 5/2012 | Moller, Jr. | E01C 5/20 52/403.1 |
| 2015/0072105 | A1 | 3/2015 | Miyashita et al. | |

FOREIGN PATENT DOCUMENTS

| | | |
|---|---|---|
| JP | H07228142 A | 8/1995 |
| WO | WO 2013/132677 A1 | 9/2013 |

OTHER PUBLICATIONS

Office Action issued in Chinese patent application No. 201580027777.X dated Jun. 4, 2018.

\* cited by examiner

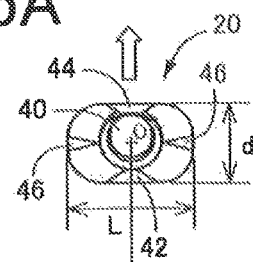
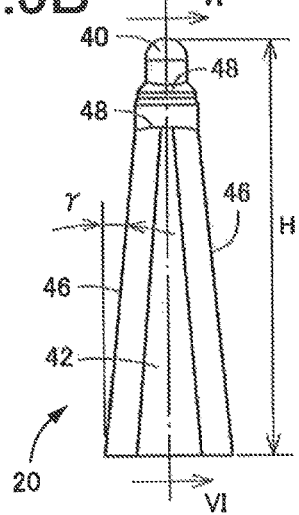
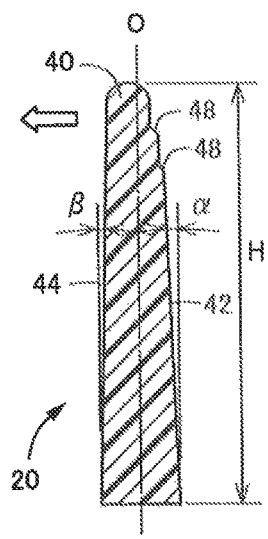

OVERLAID COMPOSITE INTERIOR COMPONENT

CROSS-REFERENCE TO RELATED APPLICATIONS

This application is a national phase application of International Application No. PCT/JP2015/063954, filed May 14, 2015, and claims the priority of Japanese Application Nos. 2014-108490, filed May 26, 2014, and 2015-016124, filed Jan. 29, 2015, the content of all of which is incorporated herein by reference.

TECHNICAL FIELD

The present invention relates to a laminated composite interior component in which a large number of projections are elastically deformed to impart cushioning properties, and in particular to a projection arrangement pattern for further improving a tactile feel.

BACKGROUND ART

There is known a laminated composite interior component that has: (a) a first member that has a predetermined mating surface; (b) a second member made of an elastically deformable resin material and having a plate portion that is generally parallel to the mating surface, the plate portion being integrally provided with a large number of projections that project toward the mating surface such that a space is formed between the mating surface and the plate portion, the second member being disposed so as to be placed on the first member with the projections contacting the mating surface, in which: (c) the large number of projections have the same shape as each other, and are configured such that a flexural rigidity of each of the projections against a compressive load is anisotropic around an axis of the projection so that the projections are each to be deflected in one direction around the axis; (d) the large number of projections are disposed on line segments that define a shape of a large number of arrangement units in accordance with an arrangement pattern in which the arrangement units are provided regularly; and (e) distal ends of the projections are pressed against the mating surface so that the projections are elastically deformed to impart cushioning properties. In a vehicle interior component (such as an ornament) described in Patent Document 1, which is an example of such a laminated composite interior component, projections are disposed on the sides of polygons in accordance with an arrangement pattern in which the polygons are provided regularly as arrangement units. FIG. 31(*b*) describes a technique for further improving the softness due to increasing the height dimension of minute projections 232 and suppressing interference among the minute projections 232 by making the directions in which the minute projections 232 fall over different from each other, thus increasing the pressing stroke.

PRIOR ART DOCUMENTS

Patent Documents

Patent Document 1 WO 2013/132677 A1

SUMMARY OF THE INVENTION

Problem to be Solved by the Invention

In the laminated composite interior component according to the prior art, however, the projections interfere with each other when the projections are deflected if the arrangement pattern of the projections is enhanced (increased) in density in order to obtain a uniform tactile sense or if the height dimension of the projections is further increased in order to further improve the softness. Thus, the laminated composite interior component according to the prior art yet has room for improvement. If the projections interfere with each other when the projections are deflected, the pressing stroke is reduced to degrade the softness, and a feel of asperities is disadvantageously produced. If the arrangement interval of the projections is increased, the height dimension of the projections can be increased. However, the difference in reaction force due to the presence or absence of the projections (the difference in reaction force between the positions at which the projections are provided and intermediate positions) is increased to produce a sense of discomfort in tactile feel.

The present invention has been made in view of the foregoing circumstances, and therefore has an object to provide a laminated composite interior component in which a large number of projections are elastically deformed to impart cushioning properties, in which the height dimension of the projections is increased while appropriately maintaining the arrangement interval of the projections to further improve the softness.

Solution to Problem

To achieve the above object, a first aspect of the invention provides a laminated composite interior component including: (a) a first member that has a predetermined mating surface; and (b) a second member made of an elastically deformable resin material and having a plate portion that is generally parallel to the mating surface, the plate portion being integrally provided with a large number of projections that project toward the mating surface such that a space is formed between the mating surface and the plate portion, the second member being disposed so as to be placed on the first member with the projections contacting the mating surface, in which (c) the large number of projections have the same shape as each other, and are configured such that a flexural rigidity of each of the projections against a compressive load is anisotropic around an axis so that the projections are each to be deflected in one direction around the axis, (d) the large number of projections are disposed on line segments that define a shape of a large number of arrangement units in accordance with an arrangement pattern in which the arrangement units are provided regularly, and (e) distal ends of the projections are pressed against the mating surface so that the projections are elastically deformed to impart cushioning properties, the laminated composite interior component characterized in that (f) the arrangement pattern is determined such that the large number of arrangement units are provided away from each other and proximate line segments of adjacent arrangement units are parallel to each other, and (g) two projections each provided on the proximate line segments are disposed in such an attitude that deflection directions, which correspond to the one direction, of the two projections are parallel to each other and at positions at which a clearance is provided between the two projections when the two projections are deflected.

The deflection direction is the direction in which the projections are to be deflected as viewed in plan when the plate portion provided with the projections is seen in the vertical direction (normal direction), and is the direction (one direction) in which the projections are deflected in the case where a compressive load is applied to the projections in a direction that is perpendicular to the plate portion.

A second aspect of the invention provides the laminated composite interior component recited in the first aspect of the invention, characterized in that the two projections each provided on the proximate line segments are disposed in such an attitude that the deflection directions of the two projections are opposite to each other such that the two projections are arranged in parallel with each other when the projections are deflected and the two projections are deflected toward each other.

A third aspect of the invention provides the laminated composite interior component recited in the first or second aspect of the invention, characterized in that polygons of a certain size are determined as the arrangement units, and the arrangement pattern is determined such that one polygon or a plurality of polygons combined with each other are taken as one unit and such units are continuously repeatedly provided.

A fourth aspect of the invention provides the laminated composite interior component recited in the third aspect of the invention, characterized in that (a) regular triangles of a certain size are determined as the arrangement units, and the arrangement pattern is determined such that a windmill shape composed of six regular triangles obtained by rotating each regular triangle by 60° about a center of rotation is taken as one unit and such windmill shapes are continuously repeatedly provided, and (b) the projections are provided, in one-to-one correspondence, on the respective line segments which constitute sides of the regular triangles, and disposed in such an attitude that each of the projections is to be deflected in a direction that is parallel to the respective line segments and in the same circumferential direction about a center line of the respective regular triangles.

A fifth aspect of the invention provides the laminated composite interior component recited in the third aspect of the invention, characterized in that (a) regular triangles of a certain size are determined as the arrangement units, and the arrangement pattern is determined such that a parallelogram obtained by combining two regular triangles with each other in inverted orientation is taken as one unit and such parallelograms are continuously repeatedly provided, and (b) the projections are provided, in one-to-one correspondence, on the respective line segments which constitute sides of the regular triangles, and disposed in such an attitude that each of the projections is to be deflected in a direction that is parallel to the respective line segments and in the same circumferential direction about a center line of the respective regular triangles.

A sixth aspect of the invention provides the laminated composite interior component recited in the first or second aspect of the invention, characterized in that (a) the arrangement units are each composed of a pair of a first line segment and a second line segment disposed in a T-shape, (b) the projections include a first projection disposed on the first line segment in such an attitude that the first projection is to be deflected in a direction that is parallel to the first line segment, and a second projection disposed on the second line segment in such an attitude that the second projection is to be deflected in a direction that is parallel to the second line segment, (c) the arrangement pattern is determined such that a pair of T-shaped arrangement units combined with each other in opposite orientation are taken as one unit and such units are continuously repeatedly provided, and (d) the arrangement pattern is determined such that the first projection disposed on the first line segment of a first arrangement unit is arranged adjacent to and in parallel with the first projection of a second arrangement unit when the first projections are deflected, and such that the second projection disposed on the second line segment of the first arrangement unit is arranged adjacent to and in parallel with the second projection of a third arrangement unit when the second projections are deflected.

Advantageous Effects of the Invention

In the laminated composite interior component as described above, it is possible to increase the height dimension while avoiding interference between the projections when the projections are deflected, because the large number of arrangement units, which constitute the arrangement pattern of the projections, are provided away from each other, the proximate line segments of the adjacent arrangement units are parallel to each other, and two projections each provided on the proximate line segments are disposed in such an attitude that the deflection directions are parallel to each other and at such positions that a clearance is provided therebetween when the projections are deflected. That is, in order to appropriately maintain the arrangement interval of the projections so as to suppress a sense of discomfort produced because of the difference in reaction force due to the presence or absence of the projections, it is possible to increase the height dimension while avoiding interference between two projections provided on the proximate line segments even in the arrangement pattern in which relatively small arrangement units are provided with a high density. This increases the pressing stroke over which the projections are deflected to further improve the softness.

In the second aspect of the invention, two projections each provided on the proximate line segments of the adjacent arrangement units are disposed in such an attitude that the deflection directions of the projections are opposite to each other and the projections are deflected toward each other such that the projections are arranged in parallel with each other when the projections are deflected. Therefore, the dimension, in the longitudinal direction (deflection direction), of the two projections together at the time when the projections are deflected is reduced. This makes it possible to suppress interference with other projections, to reduce a sense of discomfort due to the presence or absence of the projections by disposing the projections at a higher density, and to further improve the softness by increasing the height dimension of the projections. Since the deflection directions are opposite to each other, a good tactile feel quality can be obtained with the anisotropy in tactile feel at the time when the projections are pressed being mitigated.

In the fourth aspect of the invention, the arrangement pattern is determined such that a windmill shape composed of six regular triangles of a certain size obtained by rotating each regular triangle by 60° about the center of rotation is taken as one unit and such windmill shapes are continuously repeatedly provided, and the large number of projections are provided, in one-to-one correspondence, on each of the side (respective line segments) of the regular triangles, and disposed in such an attitude that each of the projections is to be deflected in a direction that is parallel to each of the sides and in the same circumferential direction about the center line of the respective regular triangles. Therefore, it is possible to dispose the projections at a high density such that the arrangement interval of the projections is appropriately maintained, and to improve the softness by increasing the height dimension of the projections while avoiding interference at the time when the projections are deflected. In particular, the projections on the sides of the regular triangles which are the arrangement units, are disposed in such an attitude that the projections are to be deflected in the same circumferential direction about the center line of the regular triangles. Therefore, the deflection directions of the projections on the proximate sides of the adjacent regular triangles are opposite to each other, and a good tactile feel quality can be obtained with the anisotropy in tactile feel at the time when the projections are pressed being mitigated. The attitude of the projections is varied by 120° each about the axis in one regular triangle, and each regular triangle is rotated by 60° about the center of rotation. Therefore, after all, the attitude of the projections is varied by 60° each about the axis in a windmill shape, and the projections are to be deflected in six directions about the axis. Consequently, a better tactile feel quality can be obtained with the anisotropy in tactile feel at the time when the projections are pressed being mitigated with the windmill shape taken as a unit, even if the individual projections are to be deflected in one direction about the axis.

In the fifth aspect of the invention, the arrangement pattern is determined such that a parallelogram obtained by combining two regular triangles of a certain size with each other in inverted orientation is taken as one unit and such parallelograms are continuously repeatedly provided, and the large number of projections are provided, in one-to-one correspondence, on each of the sides (respective line segments) of the regular triangles, and disposed in such an attitude that each of the projections is to be deflected in a direction that is parallel to each of the sides and in the same circumferential direction about a center line of the respective regular triangles. Therefore, it is possible to dispose the projections at a high density such that the arrangement interval of the projections is appropriately maintained, and to improve the softness by increasing the height dimension of the projections while avoiding interference at the time when the projections are deflected. In particular, the projections on the sides of the regular triangles, which are the arrangement units, are disposed in such an attitude that the projections are to be deflected in the same circumferential direction about the center line of the regular triangles. Therefore, the deflection directions of the projections on the proximate sides of the adjacent regular triangles are opposite to each other, and a good tactile feel quality can be obtained with the anisotropy in tactile feel at the time when the projections are pressed being mitigated. The attitude of the projections is varied by 120° each about the axis in one regular triangle, and two regular triangles are combined with each other in inverted orientation (rotated by 180°). Therefore, after all, the attitude of the projections is varied by 60° each about the axis in a parallelogram, and the projections are to be deflected in six directions about the axis. A better tactile feel quality can be obtained with the anisotropy in tactile feel at the time the projections are pressed being mitigated when the parallelogram is taken as a unit, although the individual projections are to be deflected in one direction about the axis.

In the sixth aspect of the invention, the arrangement units are each composed of a pair of a first line segment and a second line segment disposed in a T-shape; a first projection is disposed on the first line segment in such an attitude that the first projection is to be deflected in a direction that is parallel to the first line segment, and a second projection is disposed on the second line segment in such an attitude that the second projection is to be deflected in a direction that is parallel to the second line segment; a pair of T-shaped arrangement units combined with each other in opposite orientation are taken as one unit; and the arrangement pattern is determined such that the first projection of a first arrangement unit is arranged adjacent to and in parallel with the first projection of a second arrangement unit when the first projections are deflected, and such that the second projection of the first arrangement unit is arranged adjacent to and in parallel with the second projection of a third arrangement unit when the second projections are deflected. Therefore, it is possible to dispose the projections at a high density such that the arrangement interval of the projections is appropriately maintained, and to improve the softness by increasing the height dimension of the projections while avoiding interference at the time when the projections are deflected. A pair of T-shaped arrangement units are combined with each other in opposite orientation, and the arrangement pattern is determined such that the adjacent first projections, and the adjacent second projections, are arranged in parallel with each other when the projections are deflected. Therefore, the deflection directions of the first projections on the proximate first line segments, and the second projections on the proximate second line segments, of the adjacent arrangement units are opposite to each other, and a good tactile feel quality can be obtained with the anisotropy in tactile feel at the time when the projections are pressed being mitigated.

BRIEF DESCRIPTION OF THE DRAWINGS

FIGS. 5A and 5B are enlarged views of the minute projection of FIG. 4 as seen from two directions.

FIG. 6 is a vertical sectional view of a portion indicated by the arrow VI-VI of FIG. 5B.

MODES FOR CARRYING OUT THE INVENTION

Figure 1:
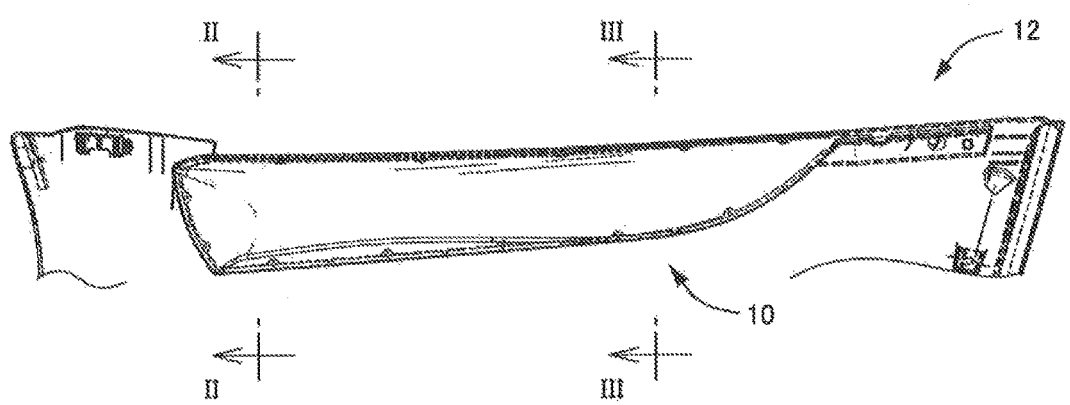
FIG. 1 is a schematic view illustrating the upper end portion of a vehicle door trim that has an ornament according to an embodiment of the present invention, as seen from a design surface side (cabin side).

The present invention is applied to vehicle interior components such as door trims, luggage side trims, and instrument panels, ornaments attached to such interior components, and so forth, but can also be applied to panel components for use other than for vehicles. The present invention may be applied not only to plate-shaped panel components, but also to three-dimensional components that include a first member that has a three-dimensional shape curved three-dimensionally and a second member placed on the surface of the first member or a base material. In the case where the first member is used as a base material, relatively hard synthetic resin materials such as rigid polyvinyl chloride, polypropylene, polyethylene, and ABS are preferably used. However, the first member may be made of other materials such as metal. In the case where the first member is used as a surface member, and for the resin material for the second member, soft polyvinyl chloride and various types of thermoplastic resins such as styrene, olefin, and polyester thermoplastic resins are preferably used. As the surface material, not only soft polyvinyl chloride and various types of thermoplastic resins such as styrene, olefin, and polyester thermoplastic resins but also a variety of surface materials such as a woven fabric, a non-woven fabric, a knit fabric, vinyl chloride, and a soft film can be adopted.

The large number of projections are configured such that the horizontal cross-sectional shape is rectangular, for example. However, a variety of shapes such as a square shape, a circular shape, an elliptical shape, an arcuately curved shape, and a crank shape are also possible. Projections that are inclined in one direction toward the distal end side can also be adopted. Such projections desirably have a tapered shape in which the cross-sectional area becomes smaller continuously or stepwise toward the distal end side. The height dimension H of the projections is suitably in the range of about $3.5 \text{ mm} \leq H \leq 6.5$ mm, for example, and is desirably as large as possible. Increasing the arrangement interval of the projections allows increasing the height dimension of H, but produces a sense of discomfort because of the difference in reaction force due to the presence or absence of the projections. Therefore, in order to improve the softness while maintaining a small arrangement interval, the height dimension H is suitably equal to or less than about 6.5 mm, and is determined as appropriate in accordance with the arrangement interval of the projections such that the projections do not interfere with each other when the projections are deflected. In the case where the horizontal cross-sectional shape at the base end portion is rectangular, the length dimension L of the horizontal cross section in the longitudinal direction is suitably in the range of about $1.5 \text{ mm} \leq L \leq 2.5$ mm, for example; the width dimension d in a direction that is orthogonal to the longitudinal direction is suitably in the range of about $0.8 \text{ mm} \leq d \leq 2.0$ mm, for example; and the four corner portions are desirably rounded to an arc with a radius of about 0.3 to 0.5 mm.

In the case where the arrangement units are polygons, for example, the arrangement pattern in which the projections are disposed is determined such that regular polygons such as regular triangles, squares, or regular hexagons of the same shape are continuously repeatedly provided. However, rectangles, rhombuses, parallelograms, scalene triangles, scalene hexagons, or the like may be continuously repeatedly provided. A plurality of types of polygons of different shapes or sizes may be repeatedly provided regularly. The projections are disposed, in one-to-one correspondence, on the sides of the polygons, for example. However, two or more projections can be disposed on each of the sides. In polygons such as rectangles and parallelograms that have sides with different lengths, the number of projections may be different between longer sides and shorter sides. The projections are disposed on the sides of the polygons in such an attitude that the deflection directions of the projections are parallel to the sides. However, the projections can also be disposed in such an attitude that the deflection directions of the projections are orthogonal to or inclined with respect to the sides. Shapes other than polygons such as a T-shape and a U-shape can also be adopted as the arrangement units. In such cases, the projections are disposed on line segments (vertical bar portions and horizontal bar portions of the T-shape and the U-shape) that define the shape of the arrangement units. The polygons are an embodiment of the arrangement units, and the sides of the polygons correspond to the line segments that define the shape of the arrangement units.

In the second aspect of the invention, the deflection directions of the two projections provided on the proximate line segments are opposite to each other, and the two projections are to be deflected toward each other. In implementing the first aspect of the invention, however, the deflection directions of the two projections may be the same as each other, or the deflection directions of the two projections may be opposite to each other and the two projections are to be deflected away from each other (outward).

The projections, the flexural rigidity of which against a compressive load is anisotropic around an axis that is perpendicular to the plate portion so that the projections are each to be deflected in one direction around the axis, can be configured such that the vertical section at a particular position around the axis has an asymmetric shape, such that the corner shapes of a root portion that rises from the plate portion differ around the axis, or such that the material partially differs around the axis. In order for the vertical section to have an asymmetric shape, the side walls of the vertical section on both sides are inclined differently, for example. The inclinations of the side walls may be partially different from each other, for example at a part of the side walls on the distal end side, not to mention a case where the inclinations of the side walls are different from each other over the entire length of the side walls.

In a suitable aspect of the present invention, (a) the laminated composite interior component is a plate-shaped panel component; (b) the second member is a surface member; (c) the first member is a plate-shaped base material constituted of a resin material that is harder than the second member; and (d) a surface of the base material functions as the mating surface, and the surface member is disposed so as to be placed on the surface to be integrally attached to the base material. In this case, further, a surface material is integrally secured to a surface on the side opposite of the plate portion from the side on which the projections are provided, to constitute a three-layer structure as a whole together with the plate-shaped base material. In another aspect of the present invention, (a) the laminated composite interior component is a plate-shaped panel component; (b) the first member is a plate-shaped surface member made of an elastically deformable resin material; and (c) the second member is integrally fixed to the base material such that a back surface on the side opposite of the plate portion from the side on which the projections are provided tightly contacts the plate-shaped base material.

EMBODIMENTS

Embodiments of the present invention will be described in detail below with reference to the drawings.

Figure 2:
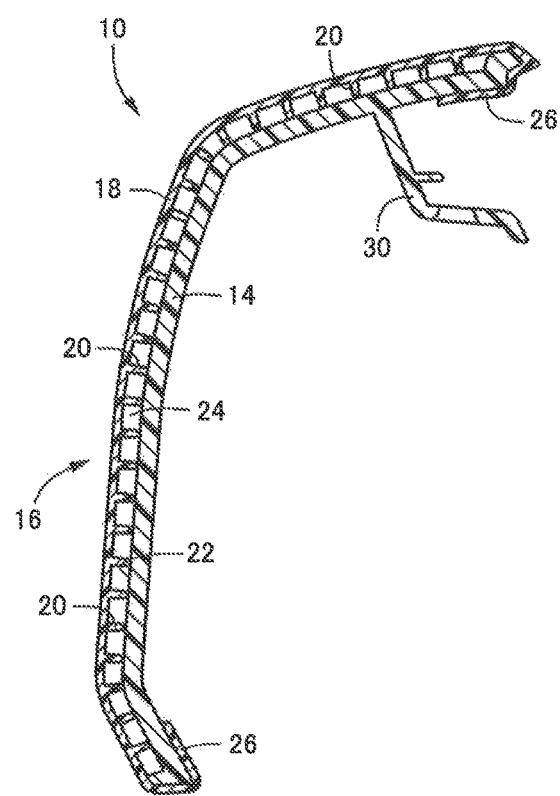
FIG. 2 is an enlarged sectional view of a portion indicated by the arrow II-II of FIG. 1.
Figure 3:
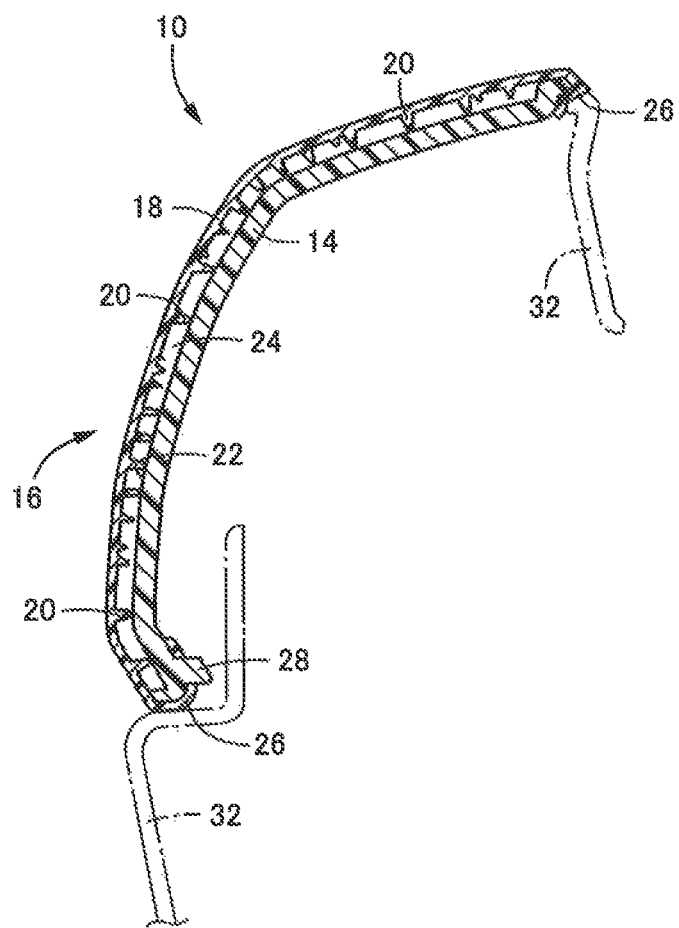
FIG. 3 is an enlarged sectional view of a portion indicated by the arrow III-III of FIG. 1.

FIG. 1 is a schematic view illustrating a shoulder portion (the lower end portion of a window) at the upper end of a vehicle door trim 12 that has an ornament 10 to which the present invention is applied, and is a front view of a door on the right side of a vehicle as seen from the design surface side, that is, the cabin side. FIG. 2 is a sectional view of the ornament 10 corresponding to a portion indicated by the arrow II-II of FIG. 1. FIG. 3 is a sectional view of the ornament 10 corresponding to a portion indicated by the arrow III-III of FIG. 1.

The ornament 10 is a plate-shaped panel composed of a plate-shaped base material 14 and a surface member 16 disposed so as to be placed on and generally in parallel with a surface 22 of the base material 14, and corresponds to the laminated composite interior component. The surface 22 of the base material 14 corresponds to the mating surface. The surface member 16 is a second member, and is integrally shaped by injection molding from a relatively soft, elastically deformable synthetic resin material such as soft polyvinyl chloride. The surface member 16 has a plate portion 18 that is generally parallel to the surface 22. A large number of minute projections 20 that project toward the surface 22 of the base material 14 are integrally provided on the back surface of the plate portion 18. A space 24 is formed between the plate portion 18 and the surface 22 because of such minute projections 20. An outer peripheral terminal portion 26 of the plate portion 18 is wrapped around the outer peripheral edge portion of the base material 14 with the distal ends of the minute projections 20 tightly contacting the surface 22 so that the surface member 16 is integrally attached to the base material 14. The minute projections 20 correspond to the projections.

The base material 14 corresponds to the first member, and is integrally shaped from a synthetic resin material such as polypropylene which is harder than the surface member 16. The terminal portion 26 is retained by a plurality of retention projections 28 provided at the outer peripheral edge portion on the back surface. A plurality of attachment engagement portions 30 are integrally provided on the back surface of the base material 14. The ornament 10 is integrally attached to the vehicle door trim 12 via the attachment engagement portions 30. With the ornament 10 integrally attached to the vehicle door trim 12 via the attachment engagement portions 30, the terminal portion 26 is pressed against the outer peripheral edge portion of the base material 14 by a plurality of pressing portions 32 provided in the vehicle door trim 12, and held in the state of being wrapped around the outer peripheral edge portion. The terminal portion 26 may be fixed to the peripheral edge portion of the base material 14 by other fixing means such as an adhesive.

Figure 4:
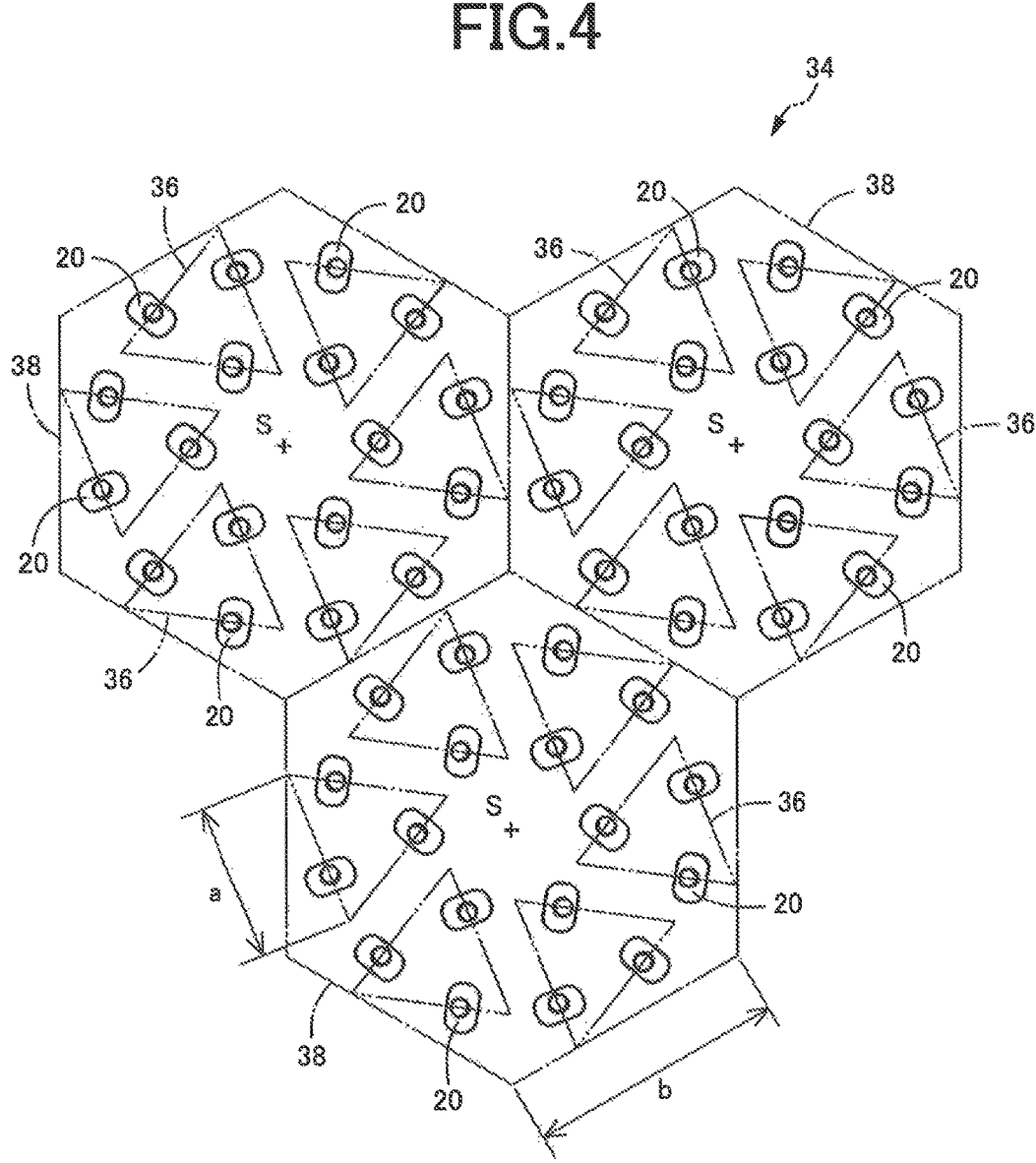
FIG. 4 is an enlarged plan view illustrating a large number of minute projections provided on the back surface of a surface member, illustrated in combination with an arrangement pattern composed of a larger number of polygons.

FIG. 4 is a plan view illustrating the large number of minute projections 20 provided on the back surface of the surface member 16, as seen in a direction that is perpendicular to the plate portion 18. FIGS. 5A and 5B illustrate the minute projection 20 as seen from two directions, in which FIG. 5A is a plan view as seen from the distal end side and FIG. 5B is a front view as seen from the front side. FIG. 6 is a vertical sectional view of a portion indicated by the arrow VI-VI of FIG. 5B, that is, as seen in the front-rear direction. As is clear from the drawings, the large number of minute projections 20 have the same shape as each other, have a longitudinal shape as viewed in plan (in the state of FIG. 4) when the minute projections 20 are seen from a direction that is perpendicular to the plate portion 18, and are disposed at positions on the sides of polygons in accordance with an arrangement pattern 34 in which a large number of the polygons of the same shape are provided regularly. In the embodiment, the shape of the minute projections 20 as viewed in plan, that is, the horizontal cross-sectional shape at the base end portion, is rectangular with four rounded corner portions, and the minute projections 20 are disposed in such an attitude that the longitudinal direction of the rectangle is orthogonal to the sides of the polygons.

As indicated by the chain double-dashed lines in FIG. 4, the arrangement pattern 34 is determined such that regular triangles 36 of a certain size are provided as the polygons away from each other, and such that the proximate sides of the adjacent regular triangles 36 are parallel to each other. Specifically, a windmill shape composed of six regular triangles 36 obtained by rotating each regular triangle 36 by 60° about a center of rotation S is taken as a unit, and such windmill shapes are continuously repeatedly provided. If each regular triangle 36 is rotated by 60° about the center of rotation S, the proximate sides of the regular triangles 36 which are adjacent to each other in a rotational direction are parallel to each other. Regular hexagons 38 illustrated in FIG. 4 each surround a windmill shape as one unit. The regular hexagons 38 are continuously provided such that the sides of the regular hexagons are superposed on each other. This allows a windmill shape to be formed with each vertex of the regular hexagons 38 serving as the center of rotation S, resulting in a large number of regular triangles 36 being continuously repeatedly provided regularly. The attitude and the distance of the regular triangles 36 with respect to the center of rotation S are set such that such regular hexagons 38 can be determined. Providing the minute projections 20 in accordance with the arrangement pattern 34 allows a generally uniform tactile feel to be obtained no matter what part of the surface member 16 is pressed. In the embodiment, in order to appropriately maintain the arrangement interval of the minute projections 20 so that a sense of discomfort in tactile feel is not produced because of the difference in reaction force due to the presence or absence of the minute projections 20, a length a of the sides of the regular triangles 36 is about 5 to 6 mm (in the embodiment, about 5.3 mm), and a length b of the sides of the regular hexagons 38 is about 8 to 9 mm (in the embodiment, about 8.5 mm). It is not necessary that the same tactile feel should be obtained over the entire ornament 10, and the side lengths a and b of the arrangement pattern 34 can be changed locally, the arrangement pattern 34 itself can be changed, or the minute projections 20 can be changed. In the embodiment, the regular triangles 36 correspond to the arrangement units, and the sides of the regular triangles 36 correspond to the line segments which define the shape of the arrangement unit.

As is clear from FIGS. 5A, 5B, and 6, the minute projection 20 has a gently tapered shape in which the cross section becomes smaller toward the distal end side, and a head portion 40 in a generally hemispherical shape is provided at the distal end of the minute projection 20. The dimensions and the angles of each portion of the minute projection 20 are determined as appropriate such that a predetermined tactile feel (such as softness and rigidity), strength, etc. can be obtained in consideration of the material of the surface member 16 etc. Specifically, a length dimension L, in the longitudinal direction, of the horizontal cross section at the base end portion is in the range of 1.5 mm≤L≤2.5 mm, and is about 1.7 mm in the embodiment; a width dimension d in a direction that is orthogonal to the longitudinal direction is in the range of 0.8 mm≤d≤2.0 mm, which is shorter than the length dimension L, and is about 1.1 mm in the embodiment; and the radius of a rounded portion at the four corner portions is in the range of 0.3 to 0.5 mm, and is about 0.45 mm in the embodiment. A height dimension H of the minute projection 20 is in the range of 3.5 mm≤H≤6.5 mm, and is about 6 mm in the embodiment. The radius of the head portion 40 is about 0.3 mm in the embodiment.

Both a front wall 42 and a rear wall 44 of the minute projection 20 are inclined inward at inclination angles α and β, respectively, toward the distal end side. With α>β, the minute projection 20 has a tapered shape in which the minute projection 20 is leaned toward the rear wall 44 with respect to an axis O toward the distal end side. A plurality of steps 48 are provided at the upper portion of the front wall 42 so as to approach the axis O. The head portion 40 is continuous with the rear wall 44 to be provided at a position displaced (offset) toward the rear wall 44 with respect to the axis O. Consequently, when a compressive load is applied to the head portion 40 in a direction that is perpendicular to the plate portion 18, that is, in a direction that is parallel to the axis O, the minute projection 20 is deflected in one direction indicated by the white arrow in FIGS. 5A and 6, that is, toward the rear wall 44. That is, as is clear from FIG. 6, the vertical section of the minute projection 20 in the front-rear direction has an asymmetric shape with respect to the axis O, and the flexural rigidity of the minute projection 20 against a compressive load is anisotropic around the axis O so that the minute projection 20 is easily deflected toward the rear wall 44 toward which the head portion 40 is displaced with respect to the axis O. In the embodiment, the inclination angle α is about 2°, and the inclination angle β is about 1.7°. A variety of aspects in which the minute projection 20 is deflected in one direction around the axis O are possible, such as an aspect in which the flexural rigidity of the minute projection 20 against a compressive load is anisotropic so that the minute projection 20 can be deflected toward the rear wall 44 just by setting the inclination angle α to be equal to 13, providing the steps 48, and providing the head portion 40 at a position displaced toward the rear wall 44. The axis O of the minute projection 20 is the center line of the horizontal cross section at the base end portion of the minute projection 20, and is a line in a direction that is perpendicular (normal) to the plate portion 18.

Figure 7:
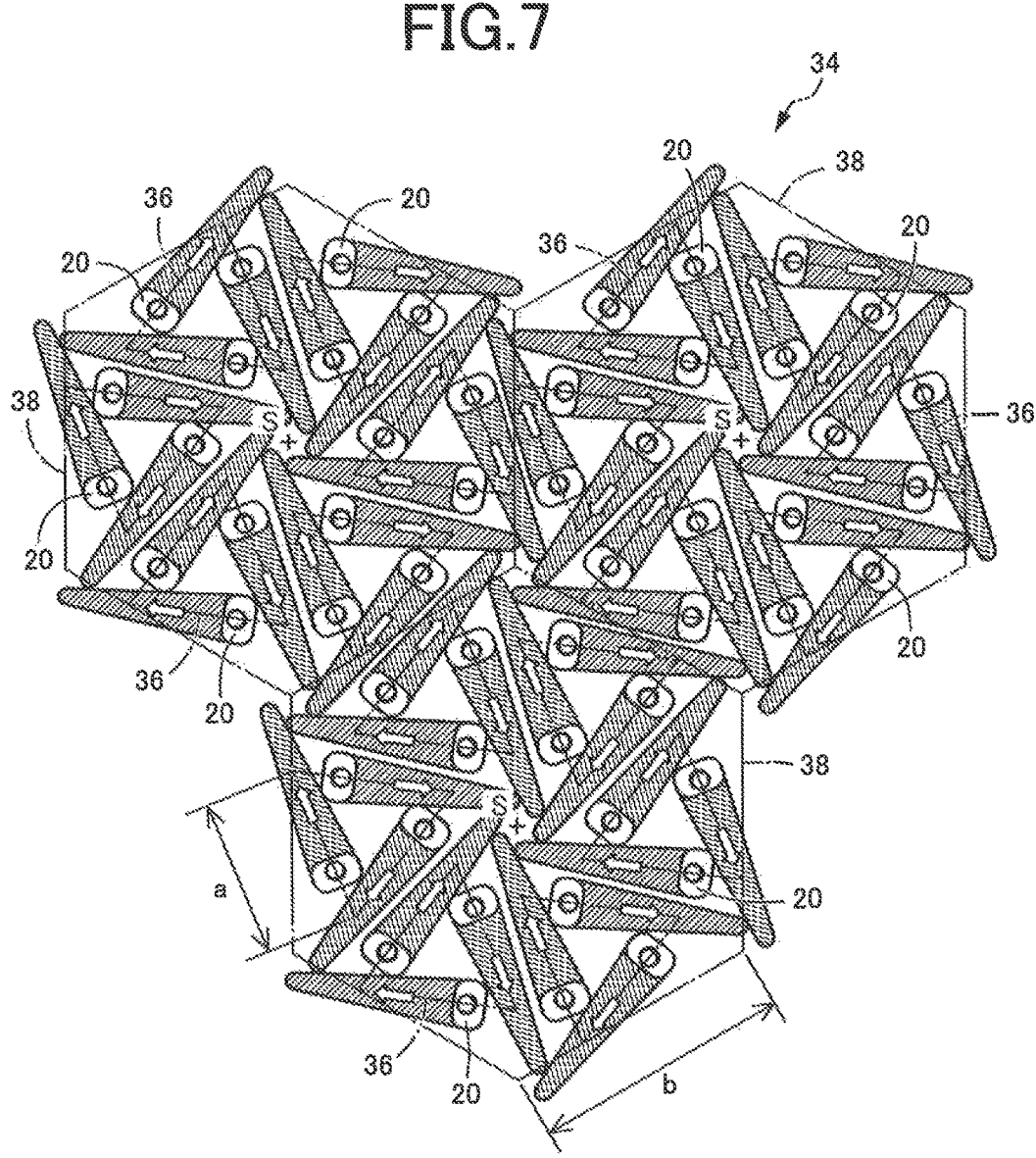
FIG. 7 illustrates the deflection directions of the minute projections being indicated by the white arrows, and regions occupied by the minute projections when the minute projections completely fall over being indicated by the oblique lines, on the plan view of FIG. 4.

As is clear from FIG. 5B, side walls 46 of the minute projection 20 on both sides are provided so as to have a symmetric shape with respect to the axis O, and have a tapered shape in which the width dimension becomes smaller toward the distal end side. An inclination angle γ is in the range of 4°≤γ≤10°, is determined as appropriate in accordance with the height dimension H, and is about 5° in the embodiment Such minute projections 20 are provided, in one-to-one correspondence, on the sides of the large number of regular triangles 36 in the arrangement pattern 34, and disposed in such an attitude that the minute projections 20 are to be deflected in a direction that is parallel to the sides and in the same circumferential direction about the center line of the regular triangles 36, that is, in the clockwise direction in the embodiment. In FIG. 7, the deflection directions of the minute projections 20 are indicated by the white arrows, and regions occupied by the minute projections 20 when the minute projections 20 completely fall over are indicated by the fine oblique lines, on the plan view of FIG. 4. As is clear from FIG. 7, the size, the shape, and the arrangement interval of the minute projections 20, that is, the height dimension H, the length dimension L, the width dimension d, the inclination angle γ, the side lengths a and b, etc., are determined such that the large number of minute projections 20 do not interfere with or are not placed on each other even in the case where the minute projections 20 completely fall over in the deflection direction. As is also clear from FIG. 7, a pair of minute projections 20 provided on the proximate sides of the adjacent regular triangles 36, which are parallel to each other, are to be deflected in deflection directions that are opposite to each other and toward each other such that the minute projections 20 are arranged in parallel with each other with a predetermined clearance therebetween when the minute projections 20 are deflected. That is, the arrangement position of the minute projection 20 on each side of the regular triangles 36 is determined at a position leaned to the side opposite to the deflection direction, rather than at the center of the side. FIG. 7 illustrates a case where the minute projections 20 completely fall over in one direction in the case where a compressive load is applied in a direction that is perpendicular to the plate portion 18. Because the actual pressing load is applied not only in the vertical direction but also in oblique directions, the deflection direction of the large number of minute projections 20 is not necessarily limited to the one direction described above, and the minute projections 20 may be deflected in a variety of directions to interfere with each other.

In the ornament 10 configured as described above, in the case where a hand, an arm, a body, etc. of a driver or passengers is pressed against the plate portion 18 of the surface member 16, the distal ends of the minute projections 20 are pressed against the surface 22 of the base material 14 to be elastically deformed so that cushioning properties are imparted and a predetermined tactile feel is obtained. In this case, in the embodiment, it is possible to increase the height dimension H while avoiding interference between the projections when the projections are deflected, because the large number of regular triangles 36, which constitute the arrangement pattern 34 of the minute projections 20, are provided away from each other, the proximate sides of the adjacent regular triangles 36 are parallel to each other, and a pair of minute projections 20 provided on the proximate sides are disposed in such an attitude that the deflection directions are parallel to each other and at such positions that a clearance is provided therebetween when the minute projections 20 are deflected. That is, in order to appropriately maintain the arrangement interval of the minute projections 20 so as to suppress a sense of discomfort produced because of the difference in reaction force due to the presence or absence of the minute projections 20, it is possible to increase the height dimension H while avoiding interference between a pair of projections provided on the proximate sides of the adjacent regular triangles 36 even in the arrangement pattern 34 in which the side lengths a and b are determined such that relatively small regular triangles 36 are provided with a high density. This increases the pressing stroke over which the minute projections 20 are deflected to further improve the softness.

A pair of minute projections 20 provided on the proximate sides of the adjacent regular triangles 36 are disposed in such an attitude that the deflection directions of the minute projections 20 are opposite to each other and the minute projections 20 are deflected toward each other such that the minute projections 20 are arranged in parallel with each other when the minute projections 20 are deflected. Therefore, the dimension, in the longitudinal direction (deflection direction), of the pair of minute projections 20 together at the time when the minute projections 20 are deflected is reduced. This makes it possible to suppress interference with other minute projections 20, to reduce a sense of discomfort due to the presence or absence of the minute projections 20 by disposing the minute projections 20 at a higher density, and to further improve the softness by increasing the height dimension H of the minute projections 20.

The deflection directions of the pair of minute projections 20 on the proximate sides are opposite to each other, and the minute projections 20 have a tapered shape. Therefore, it is possible to dispose the adjacent regular triangles 36 in more proximity to each other such that the minute projections 20 do not interfere with each other when the minute projections 20 are deflected, and to provide the minute projections 20 at a higher density. Since the deflection directions of the pair of minute projections 20 on the proximate sides are opposite to each other, a good tactile feel quality can be obtained with the anisotropy in tactile feel at the time when the minute projections 20 are pressed being mitigated.

The arrangement pattern 34 is determined such that a windmill shape composed of six regular triangles 36 of a certain size, as polygons, obtained by rotating each regular triangle 36 by 60° about the center of rotation S is taken as a unit and such windmill shapes are continuously repeatedly provided, and the large number of minute projections 20 are provided, in one-to-one correspondence, on the sides of the regular triangles 36, and disposed in such an attitude that the minute projections 20 are to be deflected in a direction that is parallel to the sides and in the same circumferential direction about the center line of the regular triangles 36. Therefore, it is possible to dispose the minute projections 20 at a high density such that the arrangement interval of the minute projections 20 is appropriately maintained, and to improve the softness by increasing the height dimension H while avoiding interference at the time when the minute projections 20 are deflected.

The attitude of the minute projections 20 is varied by 120° each about the axis O in one regular triangle 36, and each regular triangle 36 is rotated by 60° about the center of rotation S. Therefore, after all, the attitude of the minute projections 20 is varied by 60° each about the axis O in a windmill shape, and the minute projections 20 are to be deflected in six directions about the axis O. Consequently, a better tactile feel quality can be obtained with the anisotropy in tactile feel at the time when the minute projections 20 are pressed being mitigated with the windmill shape taken as a unit, although the individual minute projections 20 are to be deflected in one direction about the axis O.

Figure 8:
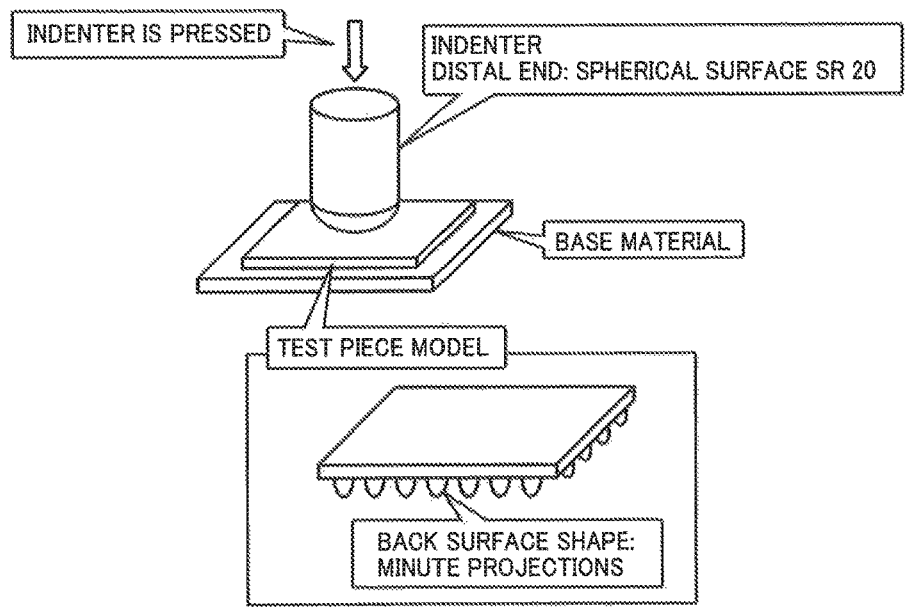
FIG. 8 illustrates analysis conditions when the relationship between the reaction force and the stroke was examined for four types of minute projections with different height dimensions through CAE analysis.
Figure 9:
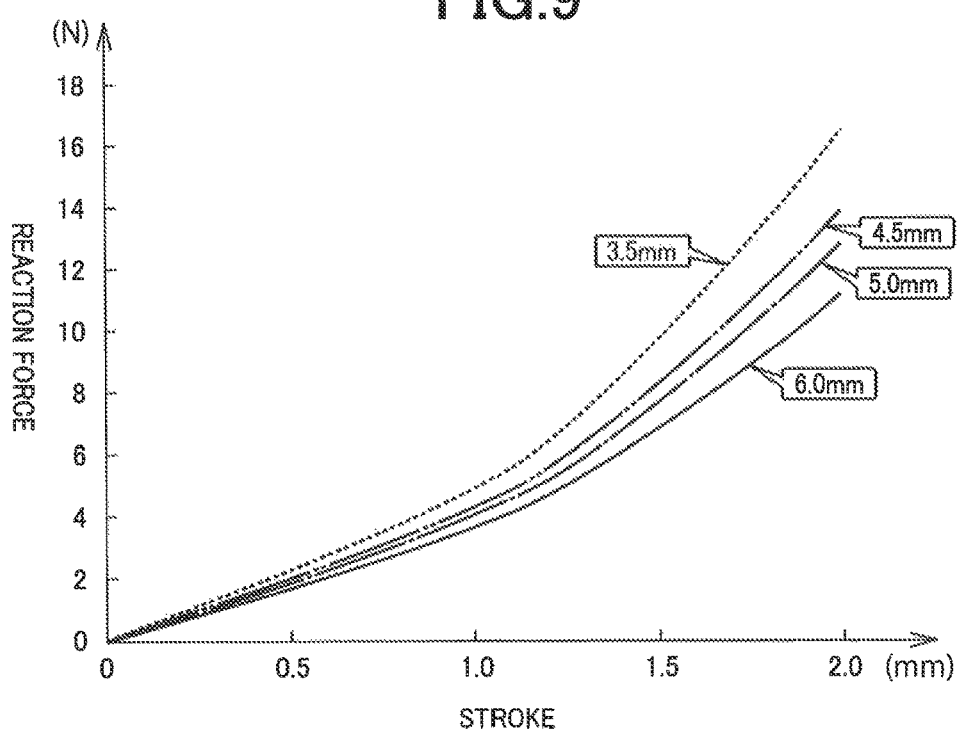
FIG. 9 illustrates the reaction force—stroke characteristics obtained through the CAE analysis of FIG. 8.

When the relationship between the reaction force and the stroke was examined for four types of minute projections 20 with different height dimensions H through CAE (Computer Aided Engineering) analysis, the results indicated in FIG. 9 were obtained. FIG. 8 illustrates the analysis conditions for the CAE analysis. A test piece model corresponding to the surface member 16 had a size of 60 mm×60 mm, and the physical property values of TPO (olefin thermoplastic elastomer) were used as the material. The base material and the indenter were rigid bodies. The radius of the spherical surface at the distal end of the indenter was 20 mm.

In FIG. 9, the solid line indicates the case of the embodiment where the height dimension H was 6.0 mm, the dot-and-dash line indicates a case where the height dimension H was 5.0 mm, the chain double-dashed line indicates a case where the height dimension H was 4.5 mm, and the broken line indicates a case where the height dimension H was 3.5 mm. From these results, it is found that the reaction force is raised more gently with respect to the stroke to provide better softness as the height dimension H of the minute projections 20 is larger. The four types of test piece models differ from each other only in height dimension H of the minute projections 20, have the same arrangement pattern 34 as that according to the embodiment, and all fall within the present invention.

Next, other embodiments of the present invention will be described. Portions of the following embodiments that are substantially the same as those of the embodiment described above are given the same reference numerals to omit detailed description.

Figure 10:
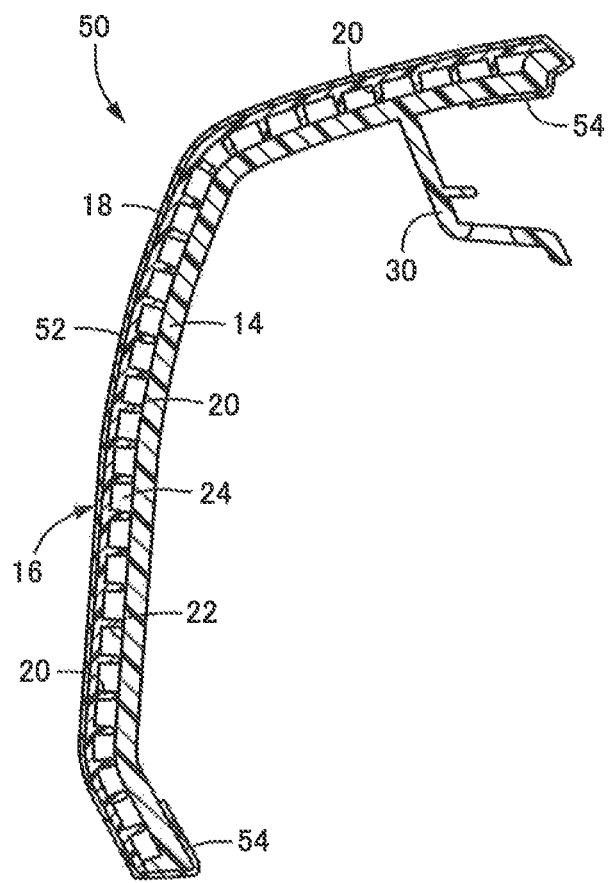
FIG. 10 is a sectional view illustrating another embodiment in which a surface material is secured to a surface member (upholstery material), FIG. 10 corresponding to FIG. 2.

An ornament 50 of FIG. 10 is different from the ornament 10 in that a surface material 52 is integrally secured to a surface of the surface member 16, that is, a surface on the opposite side of the plate portion 18 from the side on which the minute projections 20 are provided, to constitute a three-layer structure as a whole together with the plate-shaped base material 14. The surface material 52 is constituted of a woven fabric, a non-woven fabric, a knit fabric, vinyl chloride, a soft film, or the like, for example, and integrally shaped with the surface member 16 to be shaped at the same time of shaping the surface member 16 and integrally secured to the surface of the surface member 16. An outer peripheral terminal portion 54 of the surface material 52 is wrapped around the outer peripheral edge portion of the base material 14 to be retained by the retention projections 28, and the terminal portion 54 is pressed against the outer peripheral edge portion of the base material 14 by the pressing portions 32 with the ornament 50 integrally attached to the vehicle door trim 12. Consequently, the surface member 16 is integrally attached to the base material 14 together with the surface material 52.

Also with such an ornament 50, the same function and effect as those of the ornament 10 can be obtained. In addition, the surface member 16 is covered by the surface material 52. Therefore, even if a sink, non-uniformity in luster, or the like is caused on a surface on the opposite side of the plate portion 18 of the surface member 16 from the side on which the minute projections 20 are provided, such a sink, non-uniformity, or the like is not exposed to the outside, and a flaw in the surface member 16 is prevented. Therefore, room for choice in the resin material for the surface member 16 can be made larger, and the degree of freedom in design such as the shape of the minute projections 20, which is related to the tactile feel, can be enhanced. This makes it possible to adjust the tactile feel further easily and appropriately.

Figure 11:
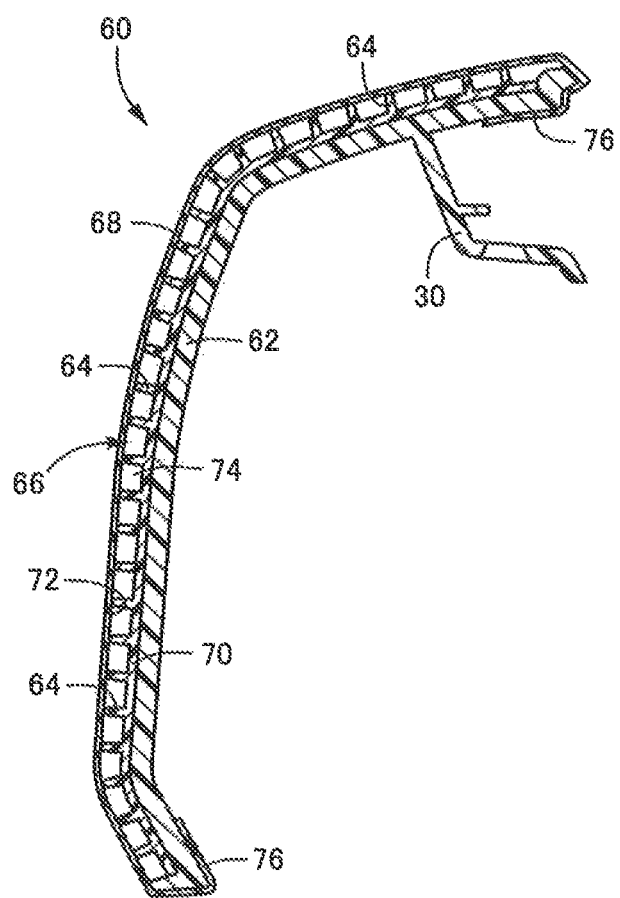
FIG. 11 is a sectional view illustrating another embodiment in which a first member is a surface member and a second member is fixed to a base material, FIG. 11 corresponding to FIG. 2.

In an ornament 60 of FIG. 11, a cushion member 66 that has a large number of minute projections 64 is provided on a surface of a plate-shaped base material 62, and a surface member 68 is attached so as to be placed on the minute projections 64 of the cushion member 66. The base material 62 is constituted of a relatively hard synthetic resin material as with the base material 14, and integrally provided with the retention projections 28 and the attachment engagement portions 30 on the back surface side. The cushion member 66 corresponds to the second member, is constituted of an elastically deformable synthetic resin material as with the surface member 16, and has a plate portion 70 integrally fixed so as to tightly contact the surface of the base material 62. The plate portion 70 is provided with a large number of minute projections 64. The minute projections 64 are constituted in the same manner as the minute projections 20, disposed on the sides of the large number of regular triangles 36 in accordance with the arrangement pattern 34, and provided to project from the plate portion 70 toward the surface member 68 such that a space 74 is formed between a back surface 72 of the surface member 68 and the plate portion 70. The distal ends of the minute projections 64 tightly contact the back surface 72. The back surface 72 corresponds to the mating surface. The surface member 68 corresponds to the first member. In the embodiment, the surface member 68 is constituted of a relatively soft synthetic resin material as with the surface member 16. An outer peripheral terminal portion 76 of the surface member 68 is wrapped around the outer peripheral edge portion of the base material 62 to be retained by the retention projections 28 (not illustrated), and the terminal portion 76 is pressed against the outer peripheral edge portion of the base material 62 by the pressing portions 32 with the ornament 60 integrally attached to the vehicle door trim 12. The surface member 68 may be further provided with the surface material 52.

In such an ornament 60, in the case where a hand, an arm, a body, etc. is pressed against the surface member 68, the back surface 72 of the surface member 68 is pressed against the distal ends of the minute projections 64, which are provided in the cushion member 66, so that the same effect as that of the ornament 10, such as a good tactile feel obtained through elastic deformation of the minute projections 64, can be obtained. The cushion member 66, which is provided with the minute projections 64, is covered by the surface member 68, and the plate portion 70 of the cushion member 66 is fixed to the base material 62. Therefore, even if a sink, non-uniformity in luster, or the like is caused on a surface on the side opposite of the plate portion 70 from the side on which the minute projections 64 are provided, such a sink, non-uniformity, or the like is not exposed to the outside. Moreover, room for choice in the resin material for the cushion member 66 can be made larger, and the degree of freedom in design such as the shape of the minute projections 64, which is related to the tactile feel, can be enhanced. This makes it possible to adjust the tactile feel further easily and appropriately.

Figure 12:
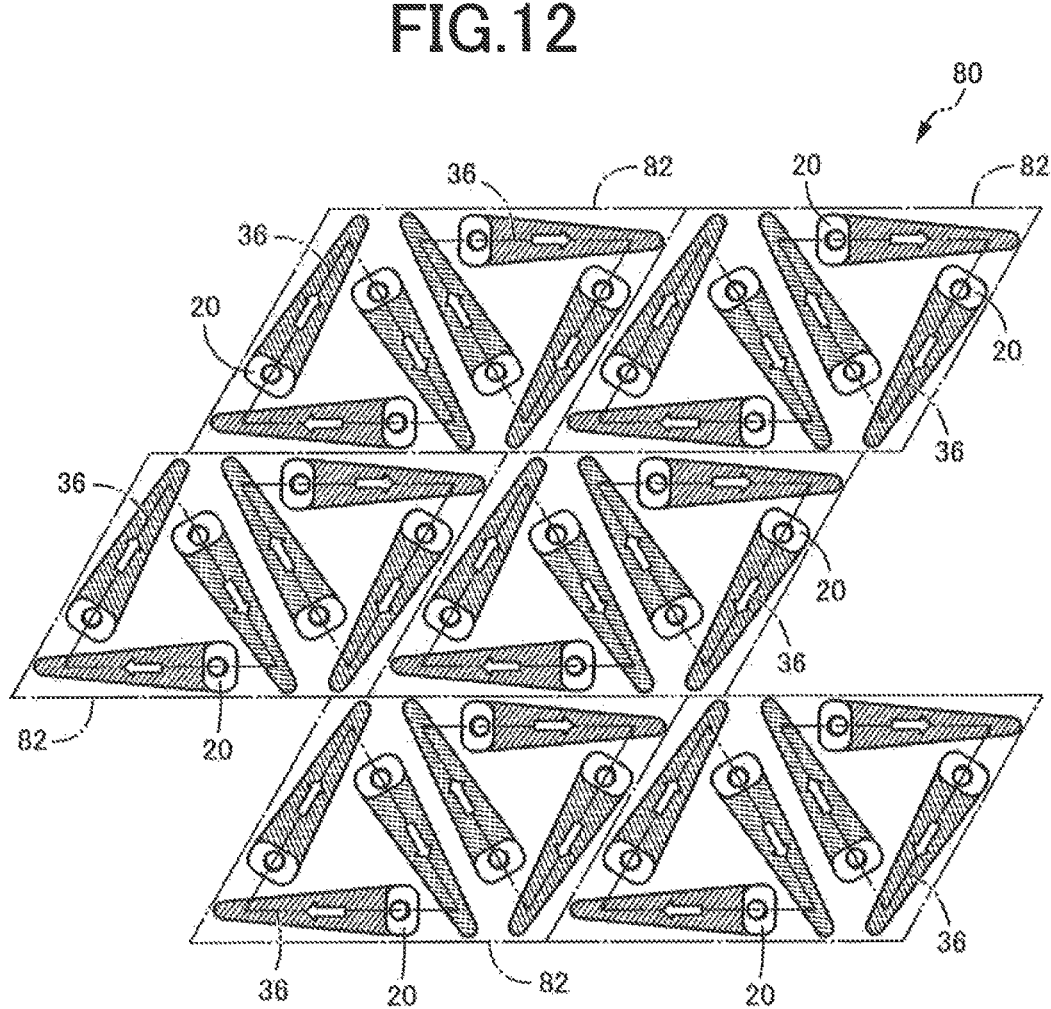
FIG. 12 is a plan view illustrating another example of the arrangement pattern of the minute projections, FIG. 12 corresponding to FIG. 7.

FIG. 12 is a plan view illustrating another example of the arrangement pattern of the minute projections 20, FIG. 12 corresponding to FIG. 7. An arrangement pattern 80 is obtained by determining, as one unit, the minute projections 20 in a parallelogram 82 that includes two regular triangles 36 combined with each other in inverted orientation, and arranging such parallelograms 82 continuously repeatedly. Also in this case, as in the embodiment, it is possible to obtain the same function and effect as those of the embodiment, such as to increase the height dimension H while avoiding interference between the projections, because the large number of regular triangles 36 are provided away from each other, the proximate sides of the adjacent regular triangles 36 are parallel to each other, and a pair of minute projections 20 provided on the proximate sides are disposed in such an attitude that the deflection directions are parallel to each other, i.e., the pair of minute projections 20 have postures parallel to each other when the minute projections 20 are deflected and the minute projections 20 are to be deflected in the opposite directions.

Figure 13:
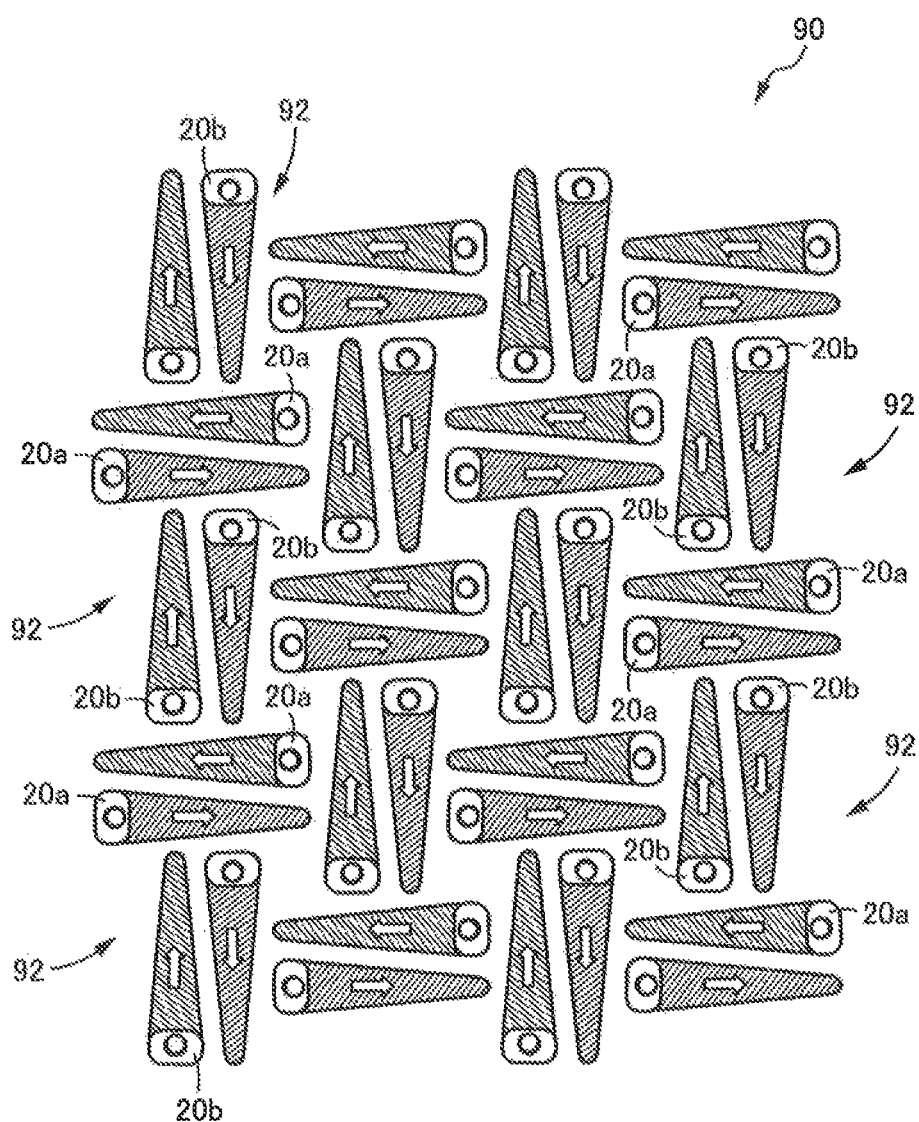
FIG. 13 is a plan view illustrating still another example of the arrangement pattern of the minute projections, FIG. 13 corresponding to FIG. 7.
Figure 14:
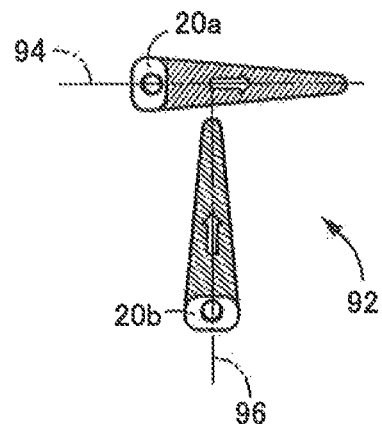
FIG. 14 illustrates a single arrangement unit of the arrangement pattern of FIG. 13.

FIG. 13 is a plan view illustrating still another example of the arrangement pattern of the minute projections 20, FIG. 13 corresponding to FIG. 7. An arrangement pattern 90 is obtained by providing T-shaped arrangement units 92 illustrated in FIG. 14 regularly. The T-shaped arrangement units 92 are each composed of a first line segment 94 for a horizontal bar portion and a second line segment 96 for a vertical bar portion. The second line segment 96 is determined so as to intersect (abut against) the first line segment 94 generally orthogonally. Also in the embodiment, the minute projections 20 are provided in accordance with the arrangement pattern 90, and the minute projections 20 are provided, in one-to-one correspondence, on the first line segments 94 and the second line segments 96. To differentiate the minute projections 20, the minute projections 20 on the first line segments 94 are referred to as "first projections 20a", and the minute projections 20 on the second line segments 96 are referred to as "second projections 20b". The first projections 20a on the first line segments 94 are each disposed in such an attitude that the first projection 20a is to be deflected in a direction that is parallel to the first line segment 94. The second projections 20b on the second line segments 96 are each disposed in such an attitude that the second projection 20b is to be deflected in a direction that is parallel to the second line segment 96 and toward the first line segment 94.

Figure 15:
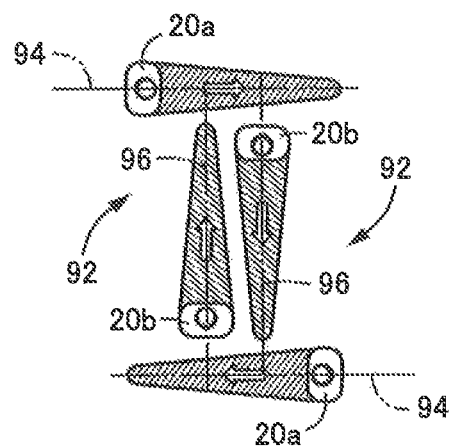
FIG. 15 illustrates an example of a combined shape as one unit in which the T-shaped arrangement units of FIG. 14 are combined with each other in inverted orientation.
Figure 16:
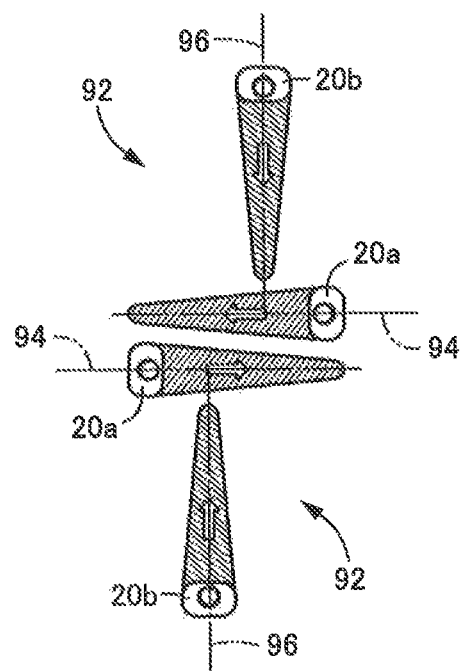
FIG. 16 illustrates another example of a combined shape as one unit in which the T-shaped arrangement units of FIG. 14 are combined with each other in inverted orientation.

The arrangement pattern 90 is determined such that a pair of T-shaped arrangement units 92 combined with each other in opposite orientation as illustrated in FIG. 15 are taken as one unit and such units are continuously repeatedly provided. Specifically, as is clear from FIG. 13, the first projection 20a of a first arrangement unit 92 is disposed in such an attitude that the deflection directions of the first projection 20a of the first arrangement unit 92 and the first projection 20a of a second arrangement unit 92 are opposite to each other and the first projections 20a are to be deflected toward each other such that the first projections 20a are arranged adjacent to and in parallel with each other with a predetermined clearance therebetween when the first projections 20a are deflected. The second projection 20b of the first arrangement unit 92 is disposed in such an attitude that the deflection directions of the second projection 20b of the first arrangement unit 92 and the second projection 20b of a third arrangement unit 92 are opposite to each other and the second projections 20b are to be deflected toward each other such that the second projections 20b are arranged adjacent to and in parallel with each other with a predetermined clearance therebetween when the second projections 20b are deflected. In the unit illustrated in FIG. 15, the second projections 20b of the pair of arrangement units 92 are arranged adjacent to and in parallel with each other when the second projections 20b are deflected. However, a pair of T-shaped arrangement units 92 may be combined with each other with the first projections 20a of the pair of arrangement units 92 arranged adjacent to and in parallel with each other when the first projections 20a are deflected to be taken as one unit as illustrated in FIG. 16, resulting in the same arrangement pattern 90.

Also in such an arrangement pattern 90, the first projection 20a of the T-shaped arrangement unit 92 is to be deflected so as to be arranged adjacent to and in parallel with the first projection 20a of a second arrangement unit 92, and the second projection 20b is also to be deflected so as to be arranged adjacent to and in parallel with the second projection 20b of a third arrangement unit 92. Therefore, it is possible to dispose the minute projections 20 at a high density such that the arrangement interval of the minute projections 20 is appropriately maintained, and to improve the softness by increasing the height dimension H of the minute projections 20 while avoiding interference at the time when the minute projections 20 are deflected.

A pair of first projections 20a provided on the proximate first line segments 94, and a pair of second projections 20b provided on the proximate second line segments 96, of the adjacent arrangement units 92 are disposed in such an attitude that the deflection directions of the minute projections 20a, 20b are opposite to each other and the minute projections 20 are deflected toward each other such that the minute projections 20a, 20b are arranged in parallel with each other when the minute projections 20 are deflected. Therefore, the dimension, in the longitudinal direction (deflection direction), of the pair of first projections 20a, and second projections 20b, at the time when the minute projections 20 are deflected is reduced. This makes it possible to suppress interference with other minute projections 20, to reduce a sense of discomfort due to the presence or absence of the minute projections 20 by disposing the minute projections 20 at a higher density, and to further improve the softness by increasing the height dimension H of the minute projections 20.

The deflection directions of the pair of first projections 20a on the proximate first line segments 94, and the pair of second projections 20b on the proximate second line segments 96, are opposite to each other, and the first projections 20a, and the second projections 20b, have a tapered shape. Therefore, it is possible to dispose the adjacent arrangement units 92 in more proximity to each other so as not to interfere with each other when the minute projections 20 are deflected, and to provide the minute projections 20 at a higher density. Since the deflection directions of the pair of first projections 20a on the proximate first line segments 94, and the pair of second projections 20b on the proximate second line segments 96, are opposite to each other, a good tactile feel quality can be obtained with the anisotropy in tactile feel at the time when the minute projections 20 are pressed being mitigated.

While embodiments of the present invention have been described in detail above with reference to the drawings, such embodiments are exemplary, and the present invention can be implemented with a variety of modifications and alterations on the basis of the knowledge of a person skilled in the art.

REFERENCE SIGNS LIST 10, 50, 60: Ornament (Laminated composite interior component) 14: Base material (First member) 16: Surface member (Second member) 18, 70: Plate portion 20, 64: Minute projections (Projections) 20a: First projections 20b: Second projections 22: Surface (Mating surface) 24, 74: Space 34, 80, 90: Arrangement pattern 36: Regular triangle (Polygon, Arrangement unit) 66: Cushion member (Second member) 68: Surface member (First member) 72: Back surface (Mating surface) 82: Parallelogram 92: Arrangement unit 94: First line segment 96: Second line segment O: Axis S: Center of rotation

The invention claimed is:

1. A laminated composite interior component including:
a first member that has a predetermined mating surface; and
a second member made of an elastically deformable resin material and having a plate portion that is generally parallel to the mating surface, the plate portion being integrally provided with a large number of projections that project toward the mating surface such that a space is formed between the mating surface and the plate portion, the second member being disposed so as to be placed on the first member with the projections contacting the mating surface, in which
the large number of projections have the same shape as each other, and are configured such that a flexural rigidity of each of the projections against a compressive load is anisotropic around an axis of each of the projections extending perpendicular to the plate portion so that the projections are each to be deflected in one direction around the axis,
each of the projections having a symmetrical shaped cross section at a base end portion with respect to the axis and an asymmetrical shaped cross section at a distal end portion with respect to the axis adjacent the mating surface,
wherein each of the projections has a longitudinal shape as viewed in plan when the projections are seen from a direction that is perpendicular to the plate portion, and
in a section in the deflection direction that is a direction orthogonal to a longitudinal direction of each of the projections, each of the projections includes a first wall and a second wall which are located on respective opposite sides of the axis and which are asymmetric with respect to the axis, and wherein a plurality of steps are provided at one of the first wall and the second wall on a distal end side of each of the projections so as to approach the axis, with the plurality of steps ending at a head portion that is continuous with the other of the first wall and the second wall at the distal end side of each of the projections,
the large number of projections are disposed on line segments that define a shape of a large number of arrangement units in accordance with an arrangement pattern in which the arrangement units are provided regularly, and
distal ends of the projections are pressed against the mating surface so that the projections are elastically deformed to impart cushioning properties,
the arrangement pattern being determined such that the large number of arrangement units are provided away from each other and proximate line segments of adjacent arrangement units are parallel to each other, and
two projections each provided on the proximate line segments being disposed in such an attitude that deflection directions, which correspond to the one direction, of the two projections are parallel to each other and at positions at which a clearance is provided between the two projections when the two projections are deflected.

2. The laminated composite interior component according to claim 1, wherein
the two projections each provided on the proximate line segments are disposed in such an attitude that the deflection directions of the two projections are opposite to each other such that the two projections are arranged in parallel with each other when the projections are deflected and the two projections are deflected toward each other.

3. The laminated composite interior component according to claim 1, wherein
polygons of a certain size are determined as the arrangement units, and the arrangement pattern is determined such that one polygon or a plurality of polygons combined with each other are taken as one unit and such units are continuously repeatedly provided.

4. The laminated composite interior component according to claim 3, wherein
- regular triangles of a certain size are determined as the arrangement units, and the arrangement pattern is determined such that a windmill shape composed of six regular triangles obtained by rotating each regular triangle by 60° about a center of rotation is taken as one unit and such windmill shapes are continuously repeatedly provided, and
- the projections are provided, in one-to-one correspondence, on the respective line segments which constitute sides of the regular triangles, and disposed in such an attitude that each of the projections is to be deflected in a direction that is parallel to the respective line segments and in the same circumferential direction about a center line of the respective regular triangles.

5. The laminated composite interior component according to claim 3, wherein
- regular triangles of a certain size are determined as the arrangement units, and the arrangement pattern is determined such that a parallelogram obtained by combining two regular triangles with each other in inverted orientation is taken as one unit and such parallelograms are continuously repeatedly provided, and
- the projections are provided, in one-to-one correspondence, on the respective line segments which constitute sides of the regular triangles, and disposed in such an attitude that each of the projections is to be deflected in a direction that is parallel to the line segments and in the same circumferential direction about a center line of the respective regular triangles.

6. The laminated composite interior component according to claim 1, wherein
- the arrangement units are each composed of a pair of a first line segment and a second line segment disposed in a T-shape,
- the projections include a first projection disposed on the first line segment in such an attitude that the first projection is to be deflected in a direction that is parallel to the first line segment, and a second projection disposed on the second line segment in such an attitude that the second projection is to be deflected in a direction that is parallel to the second line segment,
- the arrangement pattern is determined such that a pair of T-shaped arrangement units combined with each other in opposite orientation are taken as one unit and such units are continuously repeatedly provided, and
- the arrangement pattern is determined such that the first projection disposed on the first line segment of a first arrangement unit is arranged adjacent to and in parallel with the first projection of a second arrangement unit when the first projections are deflected, and such that the second projection disposed on the second line segment of the first arrangement unit is arranged adjacent to and in parallel with the second projection of a third arrangement unit when the second projections are deflected.

7. The laminated composite interior component according to claim 1, wherein
- the first wall and the second wall of each of the projections are inclined inward toward a distal end side, and
- an inclination angle of one of the first wall and the second wall is larger than an inclination angle of another of the first wall and the second wall.

\* \* \* \* \*